Sept. 13, 1927.

F. J. JARECKI 1,642,548

MACHINE FOR USE IN WELDING

Filed Feb. 28, 1927

Inventor
Frank J. Jarecki
By Frank E. Liverance, Jr.
Attorney.

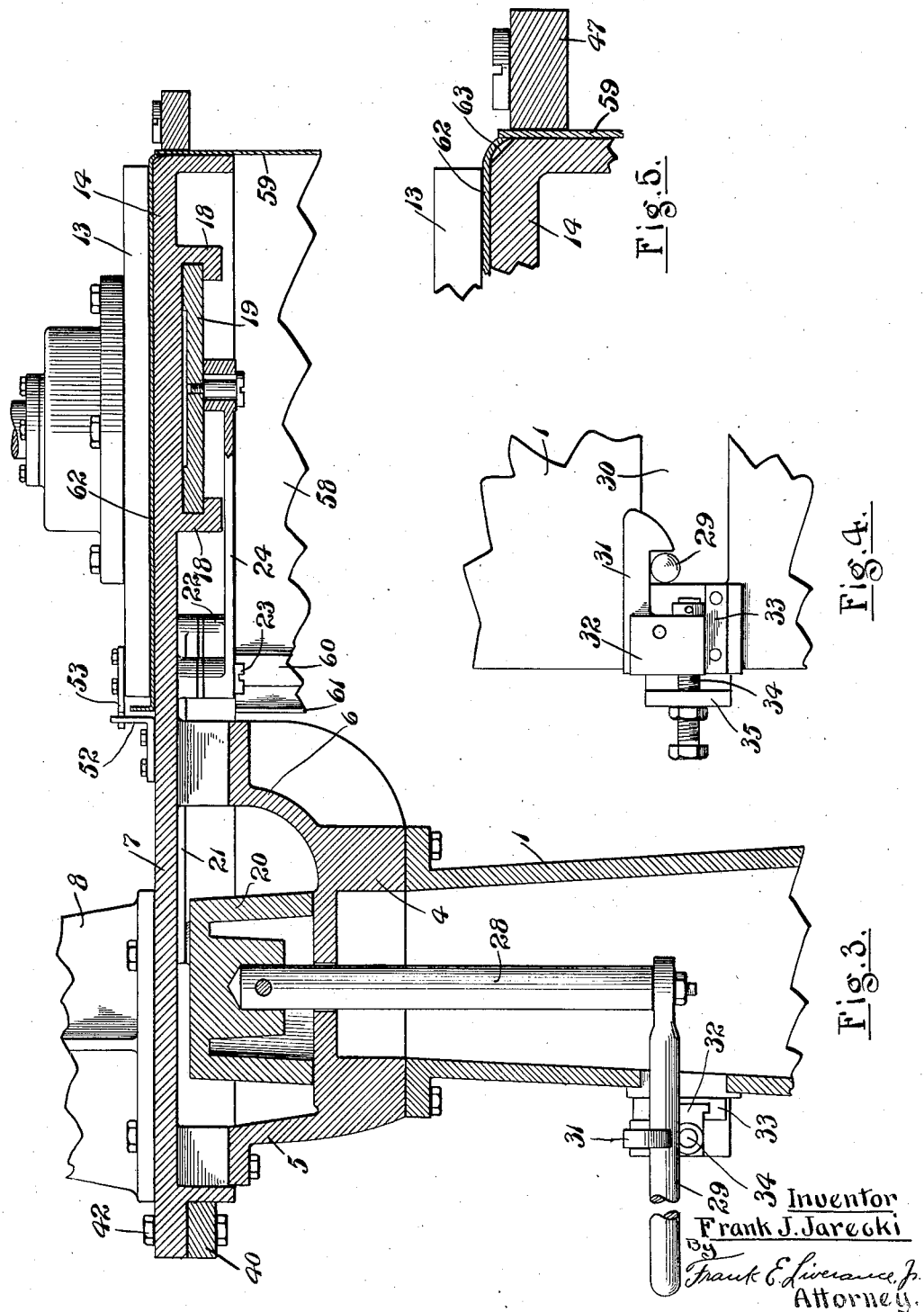

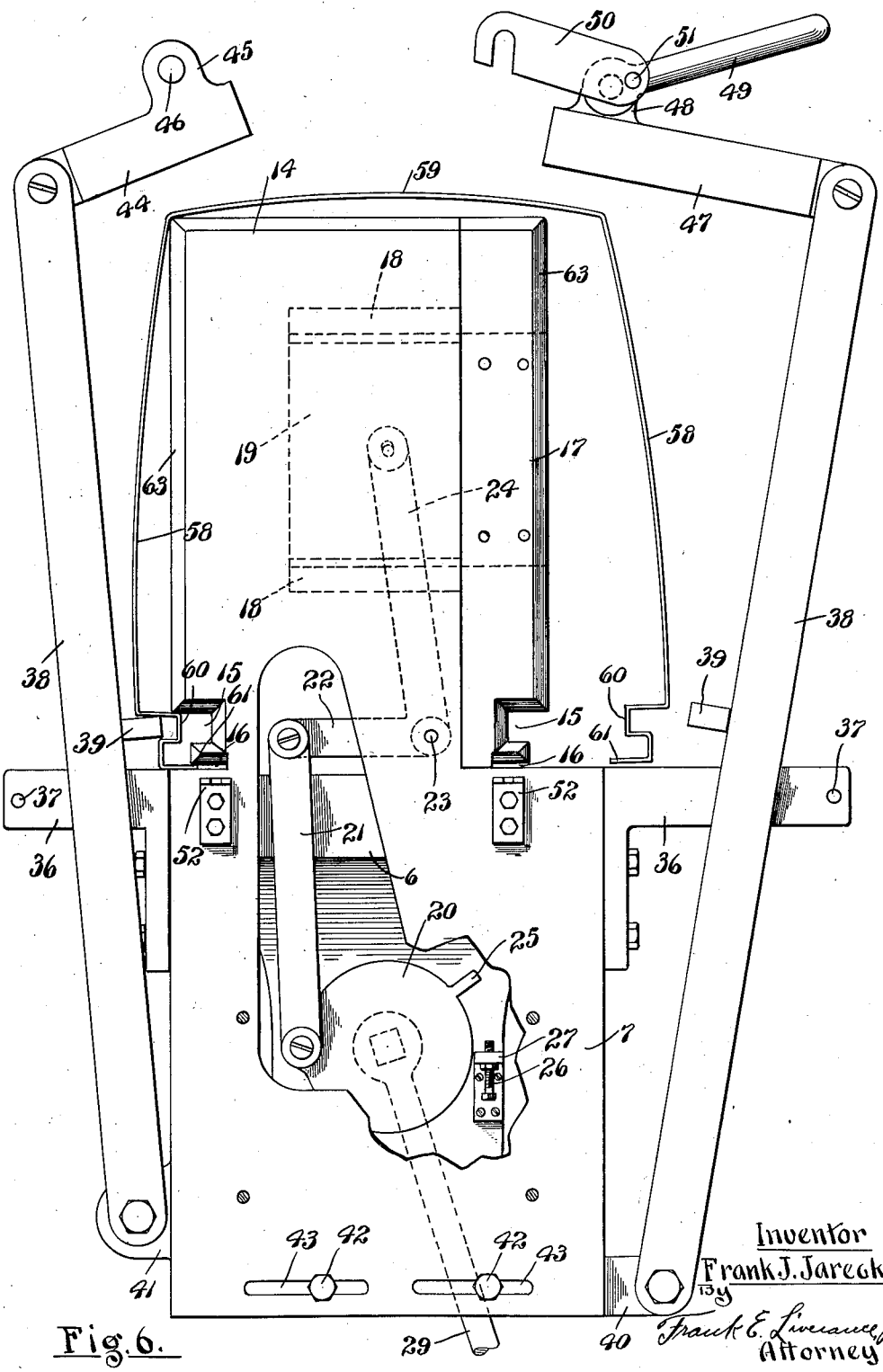

Patented Sept. 13, 1927.

1,642,548

UNITED STATES PATENT OFFICE.

FRANK J. JARECKI, OF GRAND RAPIDS, MICHIGAN.

MACHINE FOR USE IN WELDING.

Application filed February 28, 1927. Serial No. 171,541.

This invention relates to a welding fixture or a machine for use in welding, being particularly concerned with the welding of the tops and bottoms in refrigerator linings. Refrigerator linings may be of various forms, but, ordinarily, two sides and a back are bent from a single piece of sheet metal, the sides lying at right angles to the back, and the lining is completed by welding a top and a bottom at the upper and lower ends of said back and sides. There are other forms of refrigerator linings in which the body is bent in a different manner but in which a separate piece, closing either a bottom or top or back of the lining, is welded in place and the invention is directed to a machine which will properly and securely hold the parts which are to be welded together in place so that the same may be securely welded at their engaging portions.

It is an object and purpose of the present invention to provide an effective machine of the character stated, one which is simple to operate, efficient in use and with which the parts which are to be welded are positively and securely held in proper relation to each other and may be so held during the welding operations.

For an understanding of the invention whereby these ends, as well as many others, are effectively attained, reference may be had to the following description taken in connection with the accompanying drawings, in which, Fig. 1 is a side elevation of the machine of my invention, one of the linings being shown held therein, a portion of the lining being broken away for conservation of space on the drawing.

Fig. 3 is a fragmentary enlarged vertical section taken longitudinally through the welding table.

Fig. 4 is a fragmentary enlarged detail in elevation illustrating the latch which holds an operating handle in place after it has been properly operated to clamp the lining sides and back in place.

Fig. 5 is a fragmentary enlarged sectional detail showing how the top lies over the welding table and is held in proper position with respect to the adjacent edges of the sides and back of the lining.

Fig. 6 is a plan view, with parts broken away, illustrating a lining being applied to the table and before the same is clamped thereto.

Like reference characters refer to like parts in the different figures of the drawings.

Figures 1, 2:
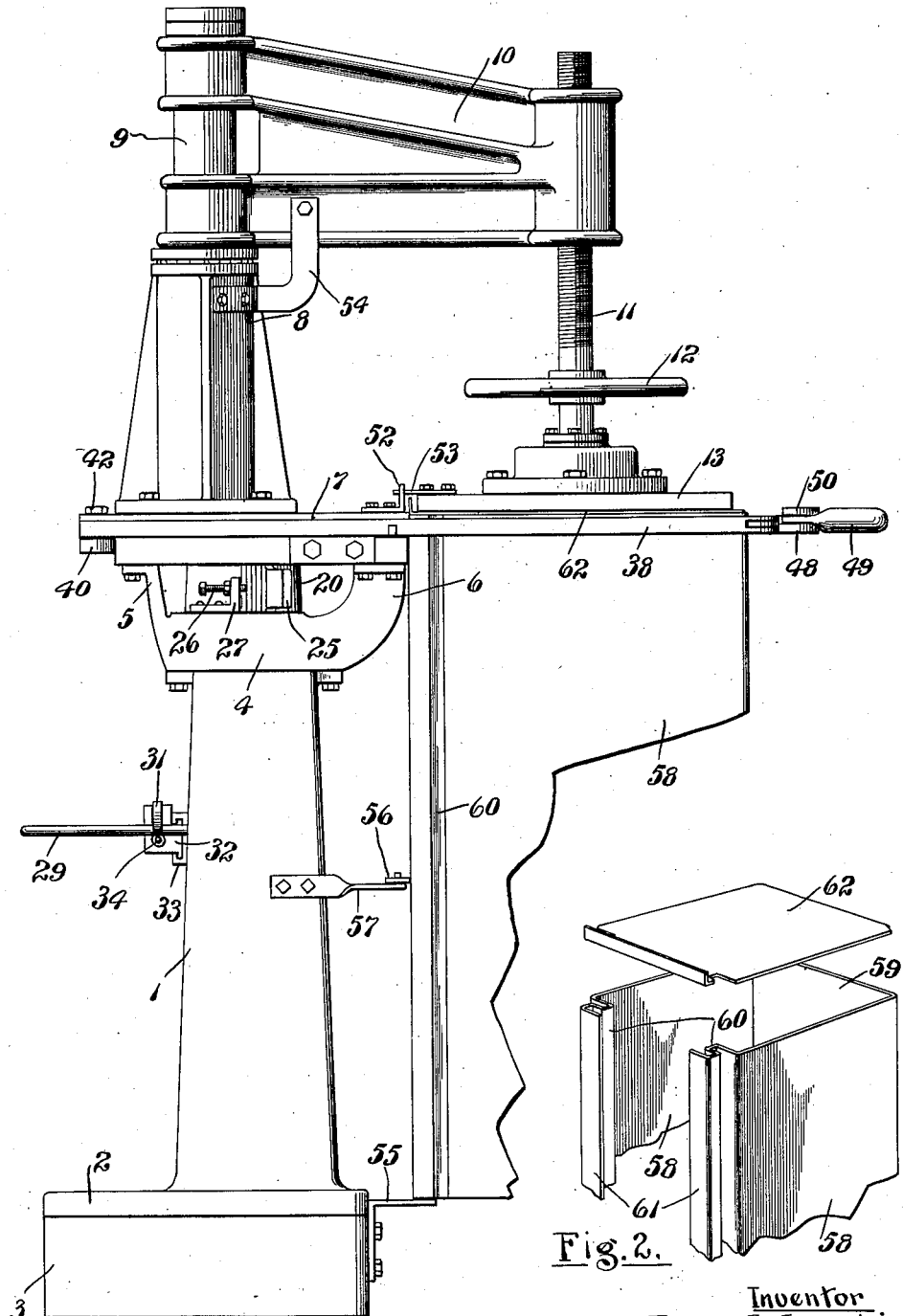
Fig. 2 is a fragmentary perspective view of the parts of the lining before the same are welded together.

In the construction of the machine a hollow vertical post or pedestal 1 is provided, having a base 2 which is mounted upon a suitable support 3, it in turn resting on the floor. At the upper end of the pedestal a head 4 is located from which, at its rear and front sides, upward extending supporting arms 5 and 6 project, the same carrying a table 7 which is located horizontally as shown. A second supporting post 8 is connected to the rear portion of the table, extending vertically therefrom, at its upper end having a cylindrical extension 9 on which an arm 10 is swingingly mounted. The forward end of the arm is provided with a vertical interiorly threaded sleeve through which a screw threaded rod 11 passes. The rod is equipped with a hand wheel 12 adjacent its lower end, and at its lower end is equipped with a clamping head 13 of rectangular form, the purpose of which will later appear.

The table 7 has, integrally formed therewith, a forwardly extending welding table member 14, one side of which aligns with a side of the table 7. The part 14, however, is narrower than the table 7 so that the opposite side does not align with the opposite side of the table 7 but is located inwardly a distance from the vertical plane of said opposite side of the table 7. The side edge of the table 14 which aligns with a side edge of the table 7, adjacent the juncture of the two parts 7 and 14, is formed with an inwardly extending rectangular recess 15, a short distance back of which is a relatively narrow inwardly extending slot 16, best shown in Fig. 6. At the opposite side edge of the welding table 14 a bar 17 is located, mounted for inward and outward adjustment with respect to the side edge of the welding table, and likewise formed with the recess 15 and slot 16, located in the same transverse vertical planes as the recess 15 and slot 16 at the opposite side of the table.

The bar 17 is connected to a slide 19 which passes underneath the welding table 14 and is slidably received between spaced apart guides 18 on the under side of the table 14, as shown in Fig. 3. This permits the bar 7 to be moved horizontally outward or inward with respect to table 14, as is evident.

On the upper side of the head 4, previously described, between the arms 5 and 6, a member 20 is mounted for rotation about a vertical axis. A link 21 is pivotally connected at one end to the member 20 at a distance from the central axis thereof, extending forward over the upper end of the arm 6, and having pivotal connection at its front end to the end of one arm 22 of a bell crank lever which is pivotally mounted at 23 on the under side of the welding table 14. The bell crank lever is completed by a forwardly extending arm 24 which, at its front end, has a loose pivotal connection with the slide 19. Rotation of the head 20, accordingly, serves to reciprocate the slide 19 and move the bar 17 inward or outward dependent upon the direction of rotation of said member 20.

A stop lug 25 extends radially outward from the member 20. When said member is rotated in one direction, that is, referring to Fig. 6, in a clockwise direction, it comes against the end of a screw 26 adjustably mounted in a bracket 27 which in turn is carried by the head 4. The extent to which the bar 17 may be moved outward is controlled by the position of the screw 26 which may be adjusted to different positions so as to positively and accurately prescribe the extent of the outward movement of the bar 17.

A vertical rock shaft 28 is permanently secured at its upper end to the member 20 and extends downwardly through the post 1. At its lower end it is equipped with a handle 29 which extends horizontally outward through an opening 30 in the side of the post whereby manual turning of the head 20 may be effected.

When the bar 17 is moved outwardly the prescribed distance, handle 29 is engaged by a latch 31 pivotally mounted on a block 32 which is adjustably mounted in a suitable guide 33 secured at one end of the opening 30. The block 32 may be adjusted to different positions by means of an adjusting screw 34 which is connected with said block and threads through a fixed bracket 35, as shown in Fig. 4. The latch holds the bar 17 in the outer position to which it has been moved and the adjustment which is provided for the position of the latch is utilized when any change in the perscribed outer position of bar 17 is made.

Figure 7:
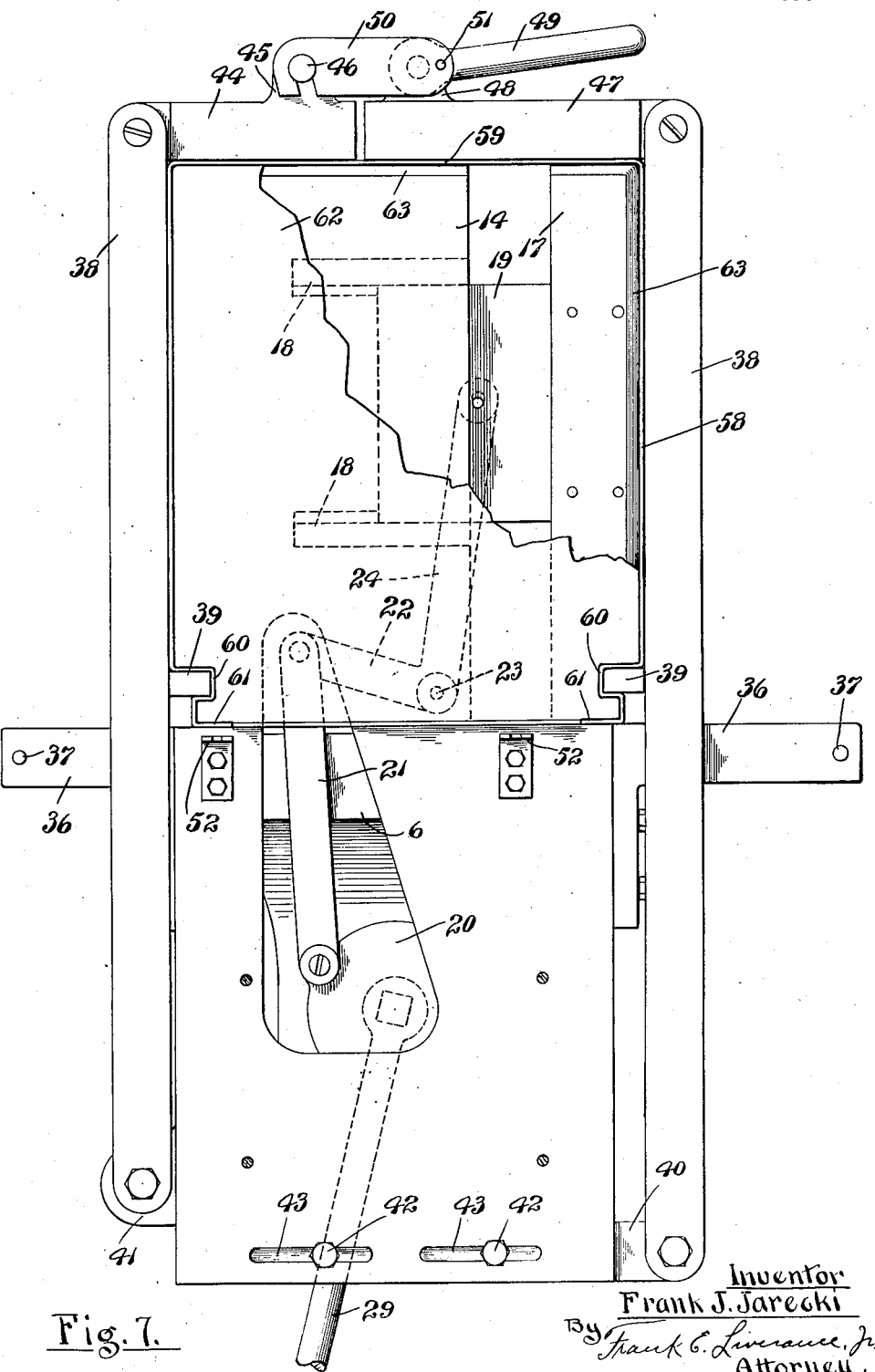
Fig. 7 is a similar view showing the lining with a top (or bottom) therefor in place and held in position for welding.

At each side of the table 7, immediately back of the front end thereof or where it joins the welding table 14, two brackets 36 are permanently secured, having outwardly extending arms at the outer end of each of which is a vertical stop pin 37. Clamping bars 38 lie over the outwardly extending arms of the brackets 36 and ride thereagainst. Each bar 38, at its inner side, is equipped with an inwardly extending block 39, as shown. One of the bars 38, that shown at the left in Figs. 6 and 7, is pivotally connected at its rear end to a lug 41 extending outwardly from the table 7. The other bar is likewise pivotally connected at its rear end to a transverse bar 40 which extends underneath the rear end of the table 7 and has a longitudinally adjustable connection therewith through the medium of set screws 42 extending through the slots 43 in the table as shown in Figs. 6 and 7. The first bar 38 pivotally mounted on the lug 41, at its forward end has a short clamping bar 44 pivotally connected thereto, from which a lug 45 extends outwardly near its free end. On the lug a headed pin 46 is fixed. The opposite bar 38, at its front end, has a longer front clamping bar 47 pivotally connected thereto, it likewise near its free end and at its front side having an outwardly extending lug 48 on which a handle 49 is pivotally mounted. A hooked latching link 50 is eccentrically mounted at 51 on the handle 49, that is, at a distance from the pivotal axis of the handle, the free end of the link 50 being hooked so that it may engage with the pin 46. Then by turning the handle inwardly toward the bar 47, the bars 38 at their front ends, are brought toward each other and clamped against the sides of a refrigerator lining while the two front bars 44 and 47 clamp against the back of the lining, as will later appear.

At the forward end of the table 7 or just back of its juncture with the welding table 14, two brackets 52 are permanently secured in spaced apart relation, having upwardly extending notched portions into which tongues 53 secured to the clamping head 13, may pass when said head is lowered. This is for the purpose of properly locating the head over the welding table 14 and clamping the bottom or top of the lining in place. A stop arm 54 also extends from the post 8 and serves as a locating stop for the arm 10 when the head 13 is swung over the table 14 so as to approximately locate the head in position.

When a lining is to be welded it is placed so that its sides lie one at one side of the table 14 and the other at the outer side of the bar 17, while the back lies in front of the front edge of the table 14 and of the front end of the bar 17. The lining is supported at its lower end by a bracket 55, shown in Fig. 1, and is located properly, substantially midway between its ends, by a gauge bar 56 carried by arms 57 extending from the post 1. The sides 58 of the lining and the back 59 are made from one piece of metal, the sides being bent approximately at right angles from the back. Each side of the lining, near its front edge, is bent inwardly and then outwardly forming the recessed portion 60, then again extended outwardly for a short distance and then bent inwardly to form the vertical inwardly extending terminal lip 61. Of course, it is evident that the front edges of the linings may be variously formed in which case the recesses and slots 15 and 16 and the blocks 39 will be shaped to correspond. After the lining member, consisting of the back and sides, has been located in place, handle 29 is operated to turn the member 20 and move the bar 17 outward until it clamps against the inner side of a side of the lining at which time the handle is engaged by the catch 31. The bars 38 are then swung toward each other at their front ends and against the outer sides of the sides 58 of the lining and the two front clamping bars 44 and 47 brought against the back of the lining and secured together by the connection described, whereupon the lining member will bear at its sides against one side edge of the table 14 and the outer edge of the bar 17, while the back will bear against the front edge of the table 14 and the front end of the bar 17. The recessed portions 60 will fit into the recesses or notches 15 and the lips 61 into the slots 16. Before this lining member is clamped in place between bars 38, 44 and 47 the top (or bottom as the case may be) 62 is laid on the upper side of the welding table 14 and bar 17 so that when the clamping bars 38, 44 and 47 are connected together and drawn tightly into place, the edges of the top (or bottom) 62 will lie inside of the upper edge portions of the back and sides of the lining member, as shown in Fig. 5. The head 13 is used to clamp the top (or bottom) 62 against the table 14 and bar 17.

\In this position the parts may be welded together. They are held in firm contact engagement with each other and the welding may be done in any desired manner such as acetylene welding or any other preferred way. In order that there shall not be undue conduction of heat through the table 14 and bar 17 the outer sides and front ends thereof are beveled as indicated at 63, thereby providing a continuous air space underneath the corners where the welding takes place. Air, being a poor conductor of heat, does not dissipate the heat the same as it would be if the corners of the table 14 and of bar 17 were in direct contact with the parts which are being welded. Also the air serves to protect said parts against damage from the heat.

The machine described is practical and effective and has so proved in service. Various adjustments of the machine for different sizes of linings are possible. For instance, the bar 40 may be adjusted longitudinally for a wider lining and in such case the two bars 44 and 47 would have to be replaced by others of different lengths. The clamping bar 17 also may be adjusted outward farther if necessary or it may be limited in its movement so as to stop at a position farther in from that shown in Fig. 7, this through the adjusting screw 26. With this machine the holding of the parts of the lining which are to be welded together is effected in an easy manner and the welding can be accomplished very quickly and easily. Many changes in the detail of construction of the machine may be resorted to without departing from the invention defined in the appended claims. Accordingly, I do not wish to be limited to the specific construction shown but consider myself entitled to all forms of structure coming within the scope of said claims.

I claim:

1. In a machine of the class described, a table around one end portion of which a lining member may be placed, means for clamping said member in fixed position with respect to the table and means for clamping a second lining member in proper position in respect to the first lining member and in engagement therewith at its edges whereby the two lining members may be held during the welding of the same together.

2. In a machine of the class described, a support, a horizontal table carried by said support having one end extending in front of the support, said front portion of the table having a part removed at one side so that it is narrower than the rear portion of the table, a bar slidably mounted at one side of the front narrower portion of said table and lying in the same plane therewith, means for moving said bar inward or outward and means for clamping a lining member against the outer sides and against the ends of said bar and narrower portion of the table.

3. In a machine of the class described, a vertical support, a horizontal table carried by said support, said table in front of the support having a part cut away at one side whereby the table is narrowed in front of the support, a bar slidably mounted on the narrow portion of the table and in the same horizontal plane therewith at the cut away portion thereof and movable inward or outward, with respect thereto, means for manually moving said bar inward or outward, said bar and narrow portion of the table being adapted to have a lining member placed around the outer sides and front ends thereof, means mounted on the table lying along the sides thereof for clamping said lining against the outer side edges of the bar and narrow portions of the table and means connecting the front end of the last mentioned means for drawing the same into clamping engagement with lining, said last mentioned means bearing against the lining and clamping it against the ends of said bar and narrow portion of said table.

4. In a construction of the class described, a vertical support, a horizontal table mounted on the upper end thereof having a portion of relatively narrow width compared to the rear portion of the table and extending in front of the support, one side of said rear and front portions of the table lying in the same vertical plane, a bar paralleling the front portion of the table at the opposite side thereof, spaced apart guides on the under side of the front portion of the table, a slide connected to said bar slidably mounted on and between the guides and means for manually moving said bar inward or outward, substantially as described.

5. In a machine of the class described, a vertical support, a horizontal table carried at the upper end of said support, said table being of rectangular form and having a front extension also of rectangular form but narrower in width than the rear portion of the table, one side of said table and the extension thereto lying in the same vertical plane, a bar paralleling the front narrower portion of the table lying at the opposite side thereof, a slide to which said bar is connected extending under said narrower portion of the table, guides for carrying said bar, a member mounted to turn about a vertical axis mounted adjacent the upper end of said support, a bell-crank lever pivotally mounted on the under side of the table having one end connected to the slide, a link connected at one end to the other arm of the lever, said link at its opposite end being connected to said member a distance from the center thereof, and means for manually turning said member back and forth about the vertical axis.

6. A construction containing the elements in combination defined in claim 5, wherein said last mentioned means comprises a vertical rock shaft attached to said rotating member and extending downwardly into the vertical support, and a handle attached to the lower end of the rock shaft and extending horizontally outward through an opening in said support.

7. A construction containing the elements in combination defined in claim 5, wherein said last mentioned means comprises a vertical rock shaft attached to said member and extending downwardly into the vertical support, a handle connected to the lower end of the rock shaft and a latch adjustably mounted on the support with which that handle automatically engages when the same is turned at one extreme of its movement.

8. A construction containing the elements in combination defined in claim 5, combined with a stop lug extending from a side of said rotating member and a set screw adjustably mounted on said support and located in the path of movement of said lug.

9. In a machine of the class described, a horizontal table around one end of which a lining member may be placed, clamping bars pivotally mounted on said table near the opposite end thereof, said bars paralleling the table and being adapted to be moved inwardly toward the table to clamp the lining member against opposite edges thereof, and means for releasably connecting the free ends of said clamping bars located in front of the end of the table where said lining is adjustably placed, said means also engaging against the lining and clamping it against the end of the table.

10. In a machine of the class described, a vertical support, a horizontal table having the front portion thereof narrower in width than the rear portion and lying in front of the support, one side of said table and the front portion thereof lying in the same vertical plane, a bar lying in the same plane with and at the opposite side of said front portion of the table, means for mounting said bar for movement inward and outward toward the side of the front narrower portion of the table, a clamping bar pivotally connected adjacent the rear end and at the straight side of the table, a second clamping bar at the opposite side of the table pivotally mounted adjacent the rear end thereof, means to which said second bar is pivotally connected adjustably mounted on the table for movement whereby the second clamping bar may be positioned at different distances from the adjacent side of the table, two bars pivotally connected to the front ends of said clamping bars, and means for releasably connecting said last mentioned two bars together in alignment and for drawing them at their free ends toward each other.

11. A construction containing the elements in combination defined in claim 10, combined with bracket supports located at the sides of the table and extending outward therefrom upon which the clamping bars rest, and stops near the outer ends of said brackets for preventing the clamping bars from being swung outward beyond the ends of the brackets.

12. A machine of the class described comprising a vertical support, a horizontal table mounted at the upper end of the support, means mounted on said table for clamping a lining having an open upper end around one end of the table, a post extending upwardly from the table, an arm swingingly mounted thereon to swing in horizontal plane, and a clamping head adjustably mounted for vertical movements at the free end of said arm adapted to be brought over the end of the table around which the lining member is placed and clamp a second lining member in proper relation to the first lining member that the two may be held in position for welding.

13. In a machine of the class described, a vertical support, a horizontal table carried at the upper end thereof and having one end projecting in front of the support, said projecting end being adapted to have a lining member located against its sides and end, means for clamping the lining member in place, a post extending upwardly from the rear portion of the table, an arm swingingly mounted to move in a horizontal plane on said post, a screw threaded shaft passing upwardly through the free end of the arm, a head connected to the lower end of the shaft and means for manually turning the shaft whereby a second lining member may be clamped by said head against the upper side of the table within the lining member clamped against the sides and ends of said table and held in position for welding the two members together.

14. A construction containing the elements in combination defined in claim 13, said front portion of the table around and over which the lining members are placed having its upper corners bevelled and cut away to provide a continuous air space under the joints between the two lining members where the two are to be welded together.

15. In a welding fixture of the class described, means for clamping a sheet metal lining consisting of a back and sides extending at right angles from the back, said means clamping the upper end of said lining at said sides and back, and means for clamping a top between the sides and in front of said back at the upper end thereof, with the edges of said lining member in contact with the sides and back of the first lining member to thereby hold the two lining members in position for welding.

In testimony whereof I affix my signature.

FRANK J. JARECKI.